US011204862B2

(12) United States Patent
Wang et al.

(10) Patent No.: US 11,204,862 B2
(45) Date of Patent: Dec. 21, 2021

(54) METHOD FOR EVALUATING APPLICATION PROGRAM INTERFACE (AP) WITH API MATURITY MATRIC AND TESTING

(71) Applicant: EMC IP Holding Company LLC, Hopkinton, MA (US)

(72) Inventors: Aaron Ren Wang, Shanghai (CN); Qi Wang, Shanghai (CN); Yun Zhang, Shanghai (CN); Weiyang Liu, Shanghai (CN); Ming Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/874,150

(22) Filed: May 14, 2020

(65) Prior Publication Data

US 2021/0303454 A1 Sep. 30, 2021

(30) Foreign Application Priority Data

Mar. 26, 2020 (CN) .......................... 202010224920.7

(51) Int. Cl.
*G06F 11/36* (2006.01)
*G06F 9/54* (2006.01)
*G06F 11/30* (2006.01)

(52) U.S. Cl.
CPC ............ *G06F 11/3692* (2013.01); *G06F 9/54* (2013.01); *G06F 11/302* (2013.01); *G06F 11/3684* (2013.01); *G06F 11/3688* (2013.01)

(58) Field of Classification Search
CPC ............... G06F 11/3692; G06F 11/302; G06F 11/3684; G06F 11/3688; G06F 9/54
(Continued)

(56) References Cited

U.S. PATENT DOCUMENTS 6,662,357 B1 * 12/2003 Bowman-Amuah ..... G06F 8/20
717/120
7,272,822 B1 * 9/2007 Riggins ................... G06F 9/451
717/124

(Continued)

OTHER PUBLICATIONS

Farooq et al., "API Peer Reviews: A Method for Evaluating Usability of Application Programming Interfaces", ACM, pp. 207-210 (Year: 2010).*

(Continued)

*Primary Examiner* — Anil Khatri
(74) *Attorney, Agent, or Firm* — Womble Bond Dickinson (US) LLP

(57) ABSTRACT

A method, a device, and a program product for evaluating an application program interface (API) are provided in embodiments of the present disclosure. According to some embodiments, a method for evaluating an API includes determining a specification score of the API by comparing a definition description for the API with a predetermined specification corresponding to the API. The specification score indicates a degree of matching between the definition description and the predetermined specification. Additionally, the method for evaluating an API includes determining a test score for the API by applying a predetermined test case set to a code set of the API. The test score indicates a test status for the code set. Further, the method for evaluating an API includes determining a maturity metric of the API based on the specification score and the test score.

18 Claims, 6 Drawing Sheets

(58) Field of Classification Search
USPC .................................................. 717/104–124
See application file for complete search history.

(56) References Cited

U.S. PATENT DOCUMENTS

| | | | | |
|---|---|---|---|---|
| 7,305,654 | B2* | 12/2007 | Patel | G06F 11/3688 714/E11.207 |
| 7,398,510 | B2* | 7/2008 | Lake | G06Q 10/04 714/E11.207 |
| 7,412,430 | B1* | 8/2008 | Moore | G06N 5/02 706/46 |
| 7,506,311 | B2* | 3/2009 | Subramanian | G06F 11/3664 714/25 |
| 7,872,652 | B2* | 1/2011 | Platzer | G06T 13/00 345/473 |
| 7,895,565 | B1* | 2/2011 | Hudgons | G06F 11/3684 717/106 |
| 7,971,180 | B2* | 6/2011 | Kreamer | G06F 8/20 717/101 |
| 8,539,282 | B1* | 9/2013 | Kabanov | G06F 11/3688 714/38.1 |
| 8,589,859 | B2* | 11/2013 | Kaulgud | G06F 11/3616 717/101 |
| 8,601,441 | B2* | 12/2013 | Kaulgud | G06F 11/3692 717/124 |
| 8,719,799 | B2* | 5/2014 | Adler | G06F 11/3676 717/130 |
| 8,805,930 | B2* | 8/2014 | Ferris | G06Q 10/10 709/204 |
| 8,856,724 | B2* | 10/2014 | Somani | G06F 8/30 717/101 |
| 8,874,477 | B2* | 10/2014 | Hoffberg | G06Q 10/103 705/37 |
| 9,146,787 | B2* | 9/2015 | Zhu | G06F 11/3409 |
| 9,513,873 | B2* | 12/2016 | Chen | H04L 67/42 |
| 10,832,173 | B1* | 11/2020 | Pistoia | G06F 40/20 |
| 10,949,333 | B1* | 3/2021 | Malde | G06F 8/70 |
| 10,990,516 | B1* | 4/2021 | Merritt | G06F 11/3688 |

OTHER PUBLICATIONS

Ellis et al, "The Factory Pattern in API Design: A Usability Evaluation", IEEE, pp. 1-10 (Year: 2007).*

Beaton et al, "Usability Evaluation for Enterprise SOA APIs", ACM, pp. 29-34 (Year: 2008).*

Katt et al, "Quantitative Security Assurance Metrics—Rest API Case Studies", ACM, pp. 1-7 (Year: 2018).*

Welke t al, "Service-Oriented Architecture Maturity", ACM, pp. 61-67 (Year: 2011).*

Allen et al, "The Grid Application Toolkit: Toward Generic and Easy Application Programming Interfaces for the Grid", IEEE, pp. 534-550 (Year: 2005).*

Barros et al, "Static Analysis for Improved Modularity of Procedural Web Application Programming Interfaces", IEEE, pp. 128182-128199 (Year: 2020).*

Baolong et al, Research and application of data management based on Data Management Maturity Model (DMM), ACM, pp. 157-160 (Year: 2018).*

* cited by examiner

```
120
/apt/v2/login:
  get:
    tags:
      -Authentication and Authorization API
    summary: SSO Login with the OIDC token.
    description: 'SSO Login with the OIDC token.'
    operationId: paramSsoLogin
    parameters:
      - name: id_token
        in: query
        required: true
        type: string
        description: The OIDC token
    responses:
      '200':
        description: Successfully logged in with Single Sign-on.
        schema:
          $ref: '#/definitions/AccessTokenResponse'
      '400':
        description: >-
          The request body is either invalid or is missing the required
          fields.
      '401':
        description:  The Authorization token is either invalid or expired.
      '500':
        description: >-
          An internal server error occurred. Please contact the system
          administrator.
      '503':
        description: >-
          The operation is currently unavailable. The system may currently be
          in maintenance mode.
```

Prism version is 2.0.21
[Conductor] stoplight API Host is http://next-api.stoplight.io
Login Scenario (1.341s)
Login, POST http://10.xxx.xxx.30:8443/api/v2/login (1.117s)
501 — × expires_in: Does not match format 'int32'
502 — √ output.status (eq) 200

Get Compliance Results Scenario (2.081s)
Get all Compliance Results., Get http://10.xxx.xxx.30:8443/api/v2/complianceResults?filter=status eq "SUCCESS"&orderby=completionTime DESC&page=1&pageSize=3 (1.416s)
503 — × (root): Invalid type. Expected: array, given: object
504 — √ output.status (eq) 200

Get a Compliance Results by id, GET http://10.xxx.xxx.30:8443/api/v2/complianceResults/86031a65-a0aa-401d-8049-eb58e6878b14 (0.656s)
505 —
× verifiedObjectives.0.failure.reason:Invalid type. Expected: string, given: null
verifiedObjectives.0.failure.remediation: Invalid type. Expected: string, given: null
verifiedObjectives.0.stageId: Invalid type. Expected: strign, given: null
verifiedObjectives.1.failure.reason: Invalid type. Expected: strign, given: null
verifiedObjectives.1.stageId: Invalid type. Expected: strign, given: null
verifiedObjectives.2.failure.reason: Invalid type. Expected: strign, given: null
verifiedObjectives.2.stageId: Invalid type. Expected: strign, given: null 506 — √ output.status (eq) 200

Logout Scenario (0.55s)
Logout, POST http://10.xxx.xxx.30:8443/api/v2/logout (0.35s)
507 — √ output.body (validate.contract) against JSON Schema
508 — √ output.status (eq) 2xx 510 — × 3 of 8 tests failed

FIG. 5

METHOD FOR EVALUATING APPLICATION PROGRAM INTERFACE (AP) WITH API MATURITY MATRIC AND TESTING

CROSS-REFERENCE TO RELATED APPLICATION

This patent application claims priority, under 35 U.S.C. § 119, of Chinese Patent Application No. 202010224920.7, filed Mar. 26, 2020, which is incorporated by reference in its entirety.

TECHNICAL FIELD

Embodiments of the present disclosure relate to the field of computer technologies, and in particular, to a method, a device, and a computer program product for evaluating an application program interface (API).

BACKGROUND

An API is used to define a functional interface or an operational interface between a system or service and an application, so that the system or service can access the corresponding application through the API. An API generally comprises a series of functions or operations and can perform how the system or service invokes these operations from the application. By means of an API, a developer can access the functions or operations without accessing source code. Lots of service providers provide services in the form of APIs for use because of such convenience. However, whether the design and development of an API is accurate, stable, and easy to use is a problem of great concern.

SUMMARY OF THE INVENTION

A solution for evaluating an API is provided in the embodiments of the present disclosure.

In a first aspect of the present disclosure, a method for evaluating an API is provided. The method comprises determining a specification score of the API by comparing a definition description for the API with a predetermined specification corresponding to the API, the specification score indicating a degree of matching between the definition description and the predetermined specification; determining a test score for the API by applying a predetermined test case set to a code set of the API, the test score indicating a test status for the code set; and determining a maturity metric of the API based on the specification score and the test score.

In a second aspect of the present disclosure, an electronic device is provided. The electronic device comprises at least one processor; and at least one memory storing computer program instructions, wherein the at least one memory and the computer program instructions are configured to, together with the at least one processor, cause the electronic device to perform actions. The actions comprise determining a specification score of an API by comparing a definition description for the API with a predetermined specification corresponding to the API, the specification score indicating a degree of matching between the definition description and the predetermined specification; determining a test score for the API by applying a predetermined test case set to a code set of the API, the test score indicating a test status for the code set; and determining a maturity metric of the API based on the specification score and the test score.

In a third aspect of the present disclosure, a computer program product is provided. The computer program product is tangibly stored in a non-volatile computer-readable medium and comprising machine-executable instructions, wherein when executed, the machine-executable instructions cause a device to perform actions. The actions comprise determining a specification score of an API by comparing a definition description for the API with a predetermined specification corresponding to the API, the specification score indicating a degree of matching between the definition description and the predetermined specification; determining a test score for the API by applying a predetermined test case set to a code set of the API, the test score indicating a test status for the code set; and determining a maturity metric of the API based on the specification score and the test score.

The summary is provided to introduce the choice of concepts in a simplified form, which will be further described in the following Detailed Description. The summary is neither intended to identify key features or major features of the present disclosure, nor intended to limit the scope of the present disclosure.

BRIEF DESCRIPTION OF THE DRAWINGS

The above and other objectives, features, and advantages of the present disclosure will become more obvious by describing example embodiments of the present disclosure in more detail with reference to the accompanying drawings. In the example embodiments of the present disclosure, the same reference numerals generally represent the same members.

FIG. 3 illustrates an example of a parsing result for a definition description of an API according to some embodiments of the present disclosure;

FIG. 5 illustrates an example user interface for presenting a test result of a code set of an API according to some embodiments of the present disclosure;

DETAILED DESCRIPTION

Figure 1:
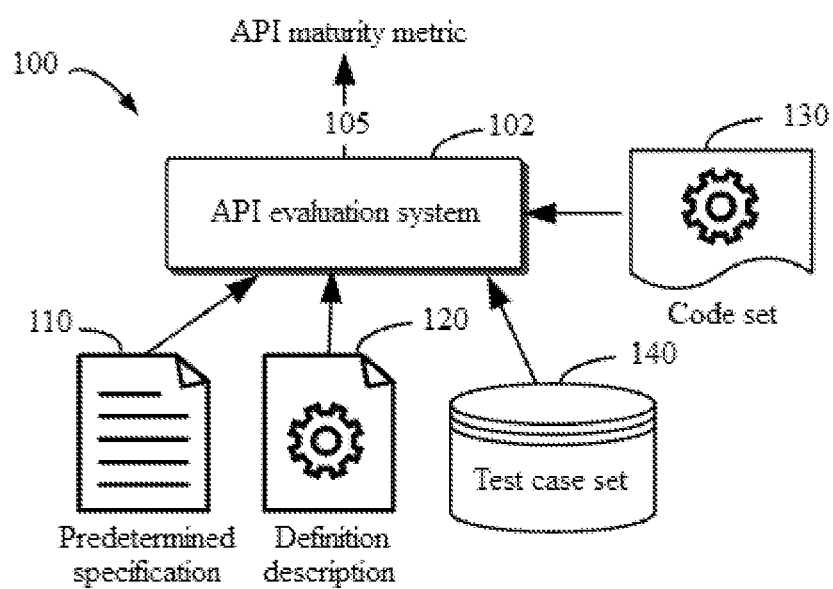
FIG. 1 is a block diagram of an automatic API evaluation system according to some embodiments of the present disclosure.

The principle of the present disclosure will be described below with reference to several example embodiments shown in the accompanying drawings. Although the preferred embodiments of the present disclosure are shown in the accompanying drawings, it should be appreciated that these embodiments are described only to enable those skilled in the art to better understand and then implement the present disclosure and are not limiting the scope of the present disclosure in any way.

The term "include" and its variants as used herein indicate open inclusion, i.e., "including, but not limited to." Unless specifically stated otherwise, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, whether an API is designed and developed to be accurate, stable, and easy to use is a problem of great concern. At present, after API code has been developed, it is generally necessary to manually verify whether the API complies with a design specification and whether the code implementation of the API is as expected. However, manual verification has high cost and difficulty in frequent implementation. In addition, the accuracy of an evaluation result depends on experience, which results in difficulties in guaranteeing the accuracy of the result and mutually comparing verification results of different APIs. Therefore, an effective and automatic API evaluation means is expected to help improve the design of an API.

A solution for evaluating an API automatically is proposed according to the embodiments of the present disclosure. The solution is aimed at determining maturity of the API. Specifically, a specification score of the API is determined by comparing a definition description for the API with a predetermined specification corresponding to the API, so as to measure a degree of matching between the definition description and the predetermined specification. In addition, a test score for the API is further determined by applying a predetermined test case set to a code set of the API, so as to indicate a test status for the code set of the API. A maturity metric of the API is determined based on the specification score and the test score. The maturity metric can measure, for example, whether the API is defined to meet the predetermined specification and has a code implementation as expected. According to the solution, maturity of an API can be evaluated automatically and effectively, thus providing a measurable evaluation result for comparison. The maturity evaluation implemented can help improve an API with low maturity.

The basic principle and several example embodiments of the present disclosure will be described below in detail with reference to the accompanying drawings.

FIG. 1 is a block diagram of automatic API evaluation system 102 according to some embodiments of the present disclosure. As shown in FIG. 1, API evaluation system 102 is configured to evaluate maturity of a particular API. Evaluation of maturity of an API is based on predetermined specification 110 corresponding to the API to be evaluated, definition description 120 for the API, code set 130 of the API, and test case set 140 for testing code set 130. API evaluation system 102 is configured to determine a maturity metric of the API. The maturity metric is configured to measure whether a current development degree of the API is as expected, especially whether it matches provisions of a predetermined specification, and whether code implementation is as expected.

The API to be evaluated may be any type of APIs, which includes, but is not limited to, an API for a network (web) service and an API for another service or system. A typical network service API includes a representational state transfer (RESTful) API. RESTful API is based on the hypertext transfer protocol (HTTP) and the uniform resource identifier (URI). The RESTful API is suitable for being used by a mobile Internet service provider as a service enable interface to implement a function of calling network resources by a third party. The RESTful API interface defines that operations respectively correspond to corresponding HTTP methods. It should be appreciated that the embodiments of the present disclosure are applicable to any other type of API.

Figure 2:
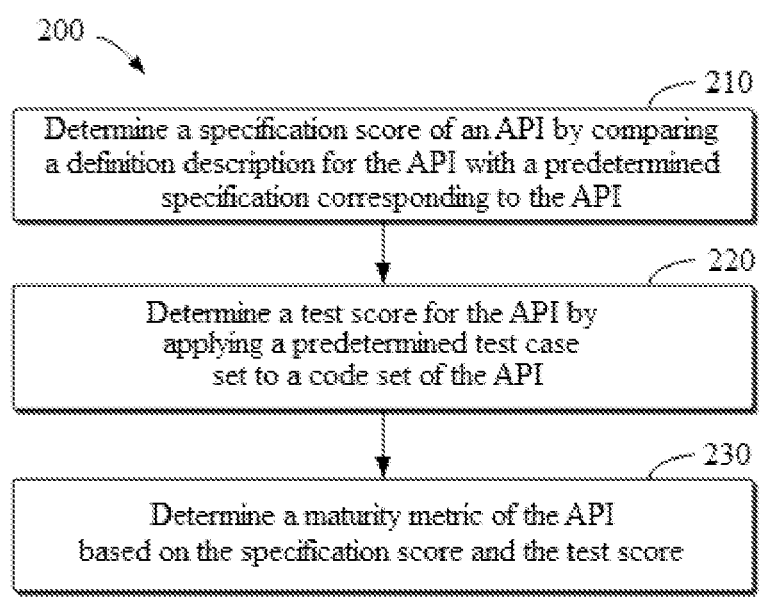
FIG. 2 is a flowchart of a process for evaluating an API according to some embodiments of the present disclosure.

A process of evaluating the API by API evaluation system 102 will be described with reference to FIG. 2. FIG. 2 is a flowchart of process 200 for evaluating an API. In block 210, API evaluation system 102 determines a specification score of the API by comparing definition description 120 for the API with predetermined specification 110 corresponding to the API. The specification score indicates a degree of matching between definition description 120 and predetermined specification 110, so that it can be measured whether current definition description 120 follows predetermined specification 110.

Corresponding predetermined specification 110 should be followed during the design of the API. Predetermined specification 110 specifies a rule to be met when the API is defined. Predetermined specification 110 may be, for example, in a text format. Predetermined specification 110 may be an industry general specification, for example, a general rule that different types of APIs should follow, and/or a particular rule of each service provider. Some example rules specified by predetermined specification 110 will be described below in detail.

Definition description 120 for the API includes a detailed description of how functions of an API to be designed are implemented, for example, how a message between a client terminal and a server is generated, how the message is transmitted, how the message is generated, a URI of resources, a query parameter, a response format, and so on. Based on definition description 120, a code developer can write code to implement the functions of the API and front-end and back-end applications of the API. In some embodiments, definition description 120 can also be published to a user of the API for the user to understand how to use the API. In some embodiments, definition description 120 can be represented in, for example, an open-source API specification (OAS) format, or any other format.

In the process of designing the API, it is generally expected that definition description 120 of the API matches predetermined specification 110 as much as possible, that is, the descriptions of various functions in definition description 120 of the API do not violate various rules required by predetermined specification 110. Therefore, in the embodiment of the present disclosure, when the API is evaluated, the specification score of the API is determined by determining a status of matching between definition description 120 for the API and predetermined specification 110.

In some embodiments, in order to determine the specification score, a rule set, including a plurality of predetermined rules defined for the API, can be pre-extracted from predetermined specification 110. The rules may include, for example, how a parameter is represented, how a URI path is represented, specific rules for various fields defined by the API, and so on when the API is defined. Some example rules are listed in Table 1 below. However, it should be appreciated that other rules may also exist, depending on industry specifications and individual specifications of various companies/organizations.

TABLE 1

| | Rule |
|---|---|
| 1 | A URI path should be represented in a form in which all lowercase words are hyphenated (such as spinal-case), for example, /api/do-something |

TABLE 1-continued

| | Rule |
|---|---|
| 2 | A URI path parameter should be represented in a form in which the first letter is capitalized (such as camelCase), for example, /api/users/{userId} |
| 3 | The URI path should be represented in a plural form (such as plurals) instead of a list form (such as itemList), for example, /api/items, rather than /api/itemList /api/item-list |
| 4 | Instead of having an id or uuid, a URI query parameter should be represented as in the URI path, for example, /items/{id}, rather than /items?id=xxx |
| 5 | A summary of an API operation should include more than three words |
| 6 | A description of an API operation should include more than five words |
| 7 | A model field with the name of plcId, protectionLifeCycle or protectionLifeCycleId should be marked as x-ppdm-deprecated: true |
| 8 | A model field with the name of dataSourceSubtype, dataSourceId, or dataSourcesId should be marked as x-ppdm-deprecated: true |
| 9 | All the APIs should have an extension field x-ppdm-executable-roles and the format of its value should be [admin, user, export-and-recovery-admin] |
| 10 | The API should be set to open |

When a particular API is evaluated, API evaluation system 102 can obtain the rule set extracted from predetermined specification 110. In addition, API evaluation system 102 further parses definition description 120 for the API to determine a definition of a current API in definition description 120. FIG. 3 illustrates an example of definition description 120 in an OAS format, in which definitions of various parts of the API are presented, for example, definitions of summary, description, operationId, parameter, response, and so on. Definition description 120 can be presented by, for example, a particular client terminal that can edit the definition description. For example, definition description 120 in the OSA format can be presented by a Stoplight tool, and a part of interest can be parsed or extracted therefrom.

API evaluation system 102 can compare definition description 120 with the rule set extracted from predetermined specification 110 to determine whether definition description 120 meets a plurality of predetermined rules in the rule set, and then determine the specification score based on a degree of definition description 120 meeting a corresponding rules.

Figure 4:
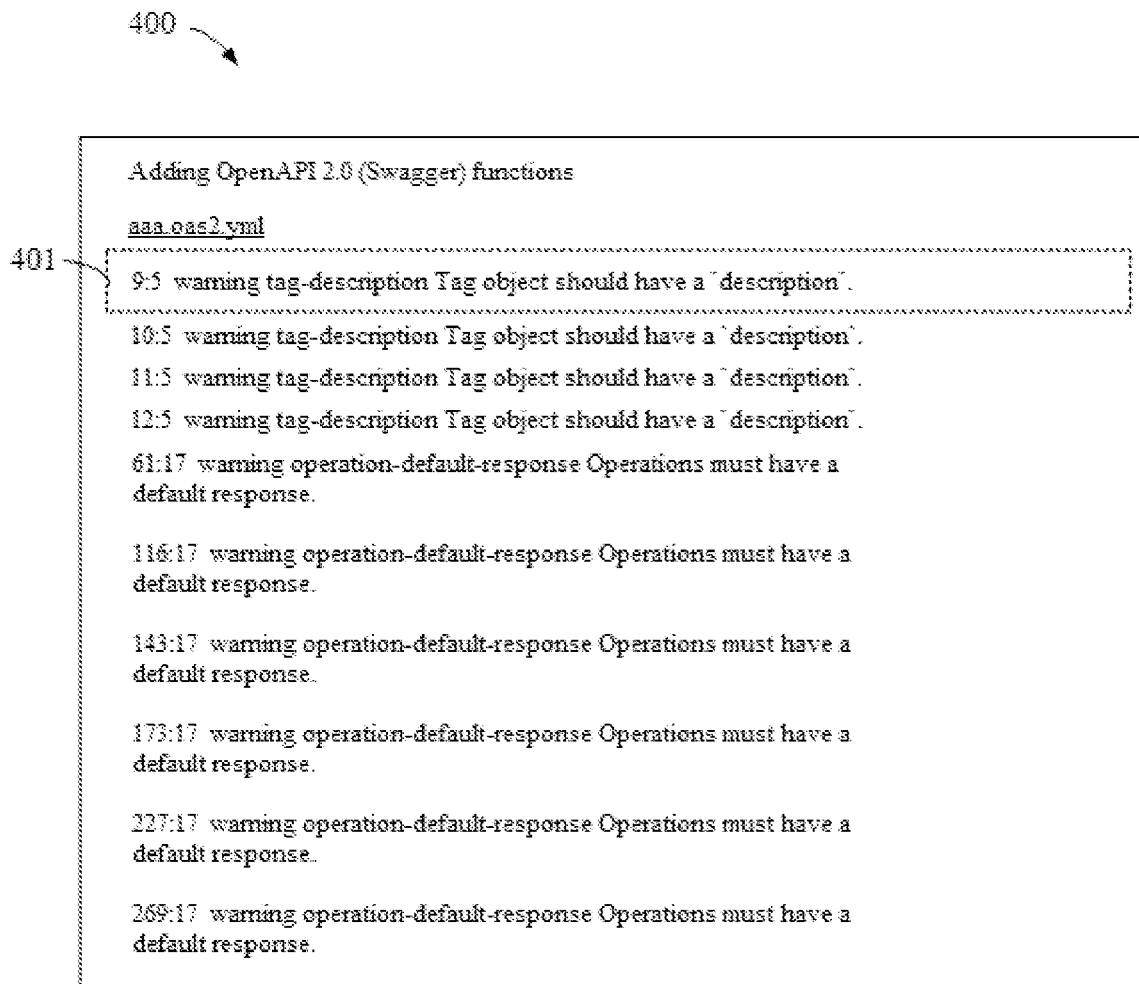
FIG. 4 illustrates an example user interface for presenting a result of matching between a definition description of an API and a predetermined specification according to some embodiments of the present disclosure.

In some embodiments, the matching with a plurality of rules can be verified by means of a matching tool. For example, a plurality of predetermined rules extracted from predetermined specification 110 can be represented as a Lint rule set, and it can be verified by means of a Lint tool, such as a Spectral tool, whether definition description 120 matches the plurality of predetermined rules. FIG. 4 illustrates example user interface 400 for presenting a result of matching between definition description 120 of an API and predetermined specification 110. In the example of FIG. 4, part 401 in user interface 400 indicates that a rule mismatch warning occurs in column 5 of line 9 of definition description 120, because a tag-description Tag object does not include a "description" part. The rule mismatch warning indicates that a definition description of a part is not sufficiently formal. The other parts in user interface 400 also indicate specific parts in definition description 120 in which a rule mismatch warning occurs. In some embodiments, in addition to the rule mismatch warning, the result of matching can further include a rule mismatch error indicating that an error in a definition description of a part is intolerable, and/or include a rule mismatch prompt indicating that the definition description of the part can be modified better, but such a modification is not mandatory.

It should be appreciated that the Spectral tool and the result of matching in FIG. 4 are only some specific examples. In other examples, automatic verification of rule matching can also be implemented using other tools. In some embodiments, rule mismatching may affect a specification score, for example, leading to the imposition of penalties on the specification score. In an example, a larger number of mismatching rules will result in a lower specification score. In some embodiments, in addition to the rule mismatching, which rules, especially which important rules, are met is also taken into account during the determination of the specification score. For example, when one or more rules are met, the specification score will be rewarded, so that the specification score is higher.

During the determination of the specification score, API evaluation system 102 can determine the specification score by considering one or more aspects of the rule matching between definition description 120 and predetermined specification 110. Aspects that affect the specification score may include the number of matching rules, the number of mismatching rules, specific matching rules, specific mismatching rules, and so on. In some embodiments, API evaluation system 102 can extract one or more features from definition description 120 and the result of matching for determining the specification score. Some example features that may affect the specification score of the API are shown in Table 2 below.

TABLE 2

| | Feature | Features determined from definition description 120 of the API | Scoring rule | Score |
|---|---|---|---|---|
| 1 | File of a definition description | aaa.oas2.yml | +5: a definition description exists | 5 |
| 2 | API path | /api/v2/login | +5: a public API path is in a form of spinal-case | 5 |
| 3 | Set to open | Yes | +5: the API is set to non-private | 5 |
| 4 | Role | No | +5: a PPDM role extension is defined (x-ppdm-executable-roles: admin, user, export-and-recovery-admin) | 0 |
| 5 | Response count | 7 | +2: one response is defined | 2*7 = 14 |

TABLE 2-continued

| Feature | Features determined from definition description 120 of the API | Scoring rule | Score |
|---|---|---|---|
| 6 Response code | 200, 302, 400, 401. 423,000,000 | +10: an appropriate response code is defined (one of 2 200, 201, 204) | 10 |
| 7 Security | No | +5: API security set to BearerAuth | 0 |
| 8 Number of rule mismatch errors | 0 | +15: there is no rule mismatch error | 15 |
| 9 Number of rule mismatch warnings | 0 | +10: there is no rule mismatch warning | 10 |
| 10 Number of rule mismatch prompts | 0 | +5: there is no rule mismatch prompt | 5 |
| 11 Number of questions related to rule mismatching | 0 | None | |

Total: 69

It should be appreciated that only examples of some features that may affect the specification score are listed in Table 2. In other embodiments, one or more other features can also be extracted from definition description 120 and the result of matching to determine the specification score.

Still referring to FIG. 2, in block 220, API evaluation system 102 determines a test score of the API by applying predetermined test case set 140 to code set 130 of the API. Code set 130 of the API is also referred to as a code implementation of the API, which will be specifically run to implement the functions of the API. Therefore, the maturity of the API is also related to a test status of the code set of the API. The test score may indicate a test status for code set 130, for example, to which degree the API is tested and whether the API test result is desirable.

A requirement for code set 130 of the API is that code set 130 written is expected to follow definition description 120 of the API, because it means that the running of code set 130 of the API can implement an expected function of the API. Generally, a test on code set 130 of the API is implemented based on predetermined test case set 140. Predetermined test case set 140 includes a plurality of test cases for testing whether code set 130 of the API can provide an expected output for different usage scenarios.

The test cases include a test target, a test environment, input data, test steps, an expected output, a test script, and so on for the API. The test cases may be generated based on definition description 120 of the API, so that a correct environment, input data, an expected output, and so on of a current API can be determined directly from definition description 120. In some embodiments, each test case may also refer to one or more other APIs in addition to the current one.

Predetermined test case set 140 can be applied to code set 130 of the API to implement the test. In some embodiments, a test tool such as Prism can be configured to test code set 130 of the API. FIG. 5 illustrates example user interface 500 for presenting a test result of code set 130 of an API. As shown in the figure, test results 501 to 508 after a plurality of test cases are applied to code set 130 of the API are presented in user interface 500. Test results 501 to 508 indicate whether code set 130 of the API can provide an expected output after the corresponding test cases are applied, wherein the symbol "√" indicates that an expected output is obtained, and the symbol "x" indicates that no expected output can be obtained. For example, test results 501, 503, and 505 indicate that no expected output can be obtained after three corresponding test cases are applied, and the remaining test results indicate that expected outputs are obtained after the corresponding test cases are applied. Count 510 of the test results is also shown in user interface 500, indicating that three of the eight test cases fail, i.e., no expected output can be provided.

In some embodiments, in order to determine the test score of the API, API evaluation system 102 can further determine a test result after one or more test cases are applied to code set 130 of the API, for example, the number of test cases to which code set 130 of the API gives an expected output, and/or the number of test cases to which code set 130 of the API gives no expected output. In some examples, a larger number of test cases to which an expected output is given may result in a higher determined test score.

In some embodiments, in order to determine the test score of the API, API evaluation system 102 can determine, from the whole testing process for code set 130 of the API, a reference status for code set 130 of the API in predetermined test case set 140. As mentioned above, each test case may reference a plurality of code sets of the API. If code set 130 of the current API is applied more times in the overall test case set, which means that code set 130 of the API has probably been tested more times, the stability, accuracy, and so on of the code set will be better, and the test score can be determined as higher accordingly. Therefore, in an embodiment, the reference status can be specifically determined as the number of test cases in predetermined test case set 140 that reference code set 130 of the API. In another embodiment, the reference status can also specify test cases that reference code set 130.

Alternatively or additionally, the reference status can also indicate whether a test case that describes the current API exists in predetermined test case set 140, for example, the current API is specifically described in a test scenario. The reference status can also indicate the number of such test cases. This aspect may affect the test score. If the current API is specifically described in some test cases, such an API may have been designed to be more mature; therefore, there is a specific description of its usage and function. Correspondingly, the test score can be determined as higher.

API evaluation system 102 can determine the test score based on the reference status and/or the test result. In some embodiments, one or more aspects of the reference status and/or one or more aspects of different test results can affect the test score to different degrees. For example, similar to the determination of the specification score, scoring rules corresponding to different test results and scoring rules for different reference statuses can be specified in advance. When a score is calculated, API evaluation system 102 can determine the test score for the API according to a specific condition of code set 130 of the API and the corresponding scoring rule.

Referring back to FIG. 2, in block 230, API evaluation system 102 determines maturity metric 105 of the API based on the specification score and the test score. The maturity metric of the API can be represented in a value, a level, or any other appropriate forms. For example, the maturity metric of the API can be determined as a direct sum or a weighted sum of the specification score and the test score. In another example, the specification score and the test score can be compared with corresponding predetermined thresholds (such as a first predetermined threshold and a second predetermined threshold), respectively. If both the specification score and the test score exceed the corresponding predetermined thresholds, API evaluation system 102 can determine that the maturity of the API is at a high level. If the specification score is lower than the first predetermined threshold or the test score is lower than the second predetermined threshold, API evaluation system 102 can determine that the maturity of the API is at a low level. As such, the maturity of the API can be measured more accurately, so that for the API determined to have a high maturity, not only the degree of matching between its definition description 120 and predetermined specification 130 is high, but also its code set 130 is written as expected, for example, meeting definition description 120.

In some embodiments, in addition to considering the matching between the definition description and the predetermined specification as well as the code implementation, the maturity metric of the API can also be based on an auxiliary usage description related to the API. The auxiliary usage description refers to related information that helps to assist the use of the API. The auxiliary usage description may generally come from the definition description of the API, an external document of the API, such as a Markdown document often written as technical instructions. API evaluation system 102 can identify the auxiliary usage description related to the API from definition description 120 and/or the external document, and determine an auxiliary score of the API based on the identified auxiliary usage description.

Specifically, when the auxiliary score is determined, API evaluation system 102 can determine, from definition description 120 of the API, whether a summary part and/or a description part of the API include(s) more descriptions of the API, for example, the number of words included in the summary part and the number of words included in the description part. If the summary part or the description part includes a predetermined quantity of words, which means that these parts have an auxiliary description, API evaluation system 102 can add a corresponding value to the auxiliary score. Alternatively or additionally, API evaluation system 102 can also determine, from definition description 120 of the API, whether one or more parameters and/or one or more responses of the API have associated description information. For example, if all parameters or responses of the API have associated description information, API evaluation system 102 can add a certain value to the auxiliary score, because the description information helps the user better understand how the API is operated and how the parameters and responses are used.

In some embodiments, API evaluation system 102 can also determine the number of external documents describing the current API or whether there is a description of the current API in a particular external document of interest. If the number of external documents describing the current API is larger or there is a description of the API in some particular external documents, API evaluation system 102 can add a certain value to the auxiliary score to further increase the auxiliary score.

The determined auxiliary score can also be used to measure the maturity of the API in conjunction with the specification score and the test score. In the design of the API, the presence of more auxiliary descriptive information about the function of the API and more external instructions means that it may be easier for users to use the API, and therefore the API is considered more mature. When the maturity of the API is determined, API evaluation system 102 can, for example, determine the maturity metric of the API as a direct sum or a weighted sum of the specification score, the test score, and the auxiliary score.

In another example, similar to the comparison of the specification score and the test score with the predetermined thresholds, the auxiliary score can also be compared with a particular threshold (such as a third predetermined threshold). Maturity metric 105 of the API is based on results of comparisons between the three types of scores and the predetermined thresholds. If all the three types of scores exceed the corresponding predetermined thresholds, the maturity level of the API is the highest, and if only two of the scores exceed the corresponding predetermined thresholds, the maturity level is determined to be medium. Similarly, if only one of the scores exceeds the corresponding predetermined threshold or none of the scores exceeds the predetermined thresholds, the maturity level of the API will be lowered accordingly.

Figures 6, 7:
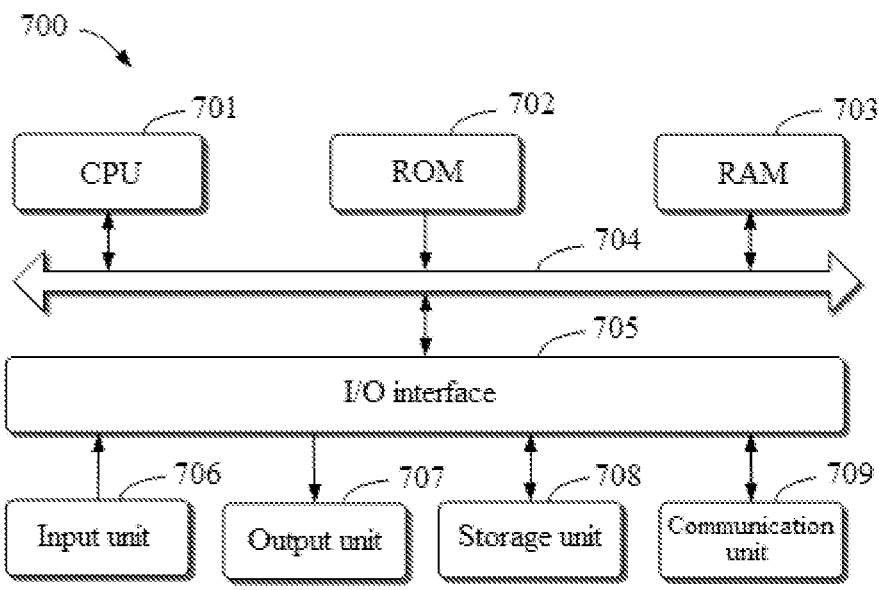
FIG. 6 illustrates an example of presentation of a maturity metric of an API according to some embodiments of the present disclosure.
FIG. 7 is a block diagram of an example device that can be configured to implement an embodiment of the present disclosure.

API evaluation system 102 can present determined maturity metric 105 of the API. FIG. 6 illustrates an example of presentation 600 of maturity metric 105 of an API, in which a specification score, a test score, and an auxiliary score of an API named "aaa.oas2.yml" are presented. In the example of FIG. 6, on the assumption that all the three scores exceed predetermined thresholds, the maturity metric of the API "aaa.oas2.yml" is the highest, as indicated by, for example, three stars.

According to an embodiment of the present disclosure, corresponding maturity metrics can be determined respectively for a plurality of APIs to be evaluated. The maturity metrics of the APIs can be compared with one another. On the other hand, for the same API, if the definition description and/or the code set are/is updated, whether the update can significantly improve the current API can also be judged by comparing the maturity metrics before and after the update.

FIG. 7 is a block diagram of example device 700 that can be configured to implement an embodiment of the present disclosure. Device 700 can be configured to implement process 200 in FIG. 2. API evaluation system 102 in FIG. 1 can include, for example, one or more devices 700.

As shown in the figure, device 700 includes central processing unit (CPU) 701 that can perform various appropriate actions and processing according to computer program instructions stored in read-only memory (ROM) 702 or computer program instructions loaded from storage unit 708 to random access memory (RAM) 703. Various programs and data required for the operation of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various methods and processing described above, for example, process 200, are performed by processing unit 701. For example, in some embodiments, process 200 may be implemented as a computer software program or computer program product that is tangibly included in a machine-readable medium, for example, a non-transitory computer-readable medium such as storage unit 708. In some embodiments, some or all of the computer programs may be loaded and/or installed onto device 700 through ROM 702 and/or communication unit 709. When the computer program is loaded into RAM 703 and executed by CPU 701, one or more steps of process 200 described above can be implemented. Alternatively, in other embodiments, CPU 701 may also be configured to implement process 200 in any other suitable manners (such as by means of firmware).

It should be appreciated by those skilled in the art that various steps of the method according to the present disclosure can be implemented using a general-purpose computing apparatus. They can be concentrated on a single computing apparatus or distributed over a network composed of a plurality of computing devices. Optionally, they can be implemented using program code executable by a computer apparatus, so that they can be stored in a storage apparatus and executed by the computing apparatus, or they are made into respective integrated circuit modules, or a plurality of modules or steps of them are made into a single integrated circuit module. As such, the present disclosure is not limited to any specific combination of hardware and software.

It should be appreciated that although several apparatuses or sub-apparatuses of the device are mentioned in the detailed description above, such division is merely exemplary rather than mandatory. In fact, according to the embodiments of the present disclosure, the features and functions of two or more of the apparatuses described above can be embodied in one apparatus. On the contrary, the features and functions of one of the apparatuses described above can be further divided into a plurality of apparatuses.

The above are only optional embodiments of the present disclosure, which are not intended to limit the present disclosure. For those skilled in the art, the present disclosure may include a variety of modifications and changes. Any modification, equivalent replacement, improvement, and so on made within the spirit and principle of the present disclosure should all be encompassed in the protection scope of the present disclosure.

The invention claimed is:

1. A method for evaluating an application programming interface (API), comprising:
   determining a specification score of the API by comparing a definition description for the API with a predetermined specification corresponding to the API, the specification score indicating a degree of matching between the definition description and the predetermined specification;
   determining a test score for the API by applying a predetermined test case set to a code set of the API, the test score indicating a test status for the code set;
   determining a maturity metric of the API based on the specification score and the test score,
   wherein the maturity metric indicates that the API meets the predetermined specification and has the code set implementing functions of the API, and
   wherein the maturity metric of the API is determined as a direct sum or a weighted sum of the specification score and the test score;
   identifying an auxiliary usage description related to the API; and
   determining an auxiliary score of the API based on the auxiliary usage description, wherein determining the maturity metric of the API further comprises:
   determining the maturity metric further based on the auxiliary score.

2. The method of claim 1, wherein identifying the auxiliary usage description comprises at least one of the following:
   identifying the auxiliary usage description related to the API from the definition description of the API; and
   identifying the auxiliary usage description related to the API from an external document of the API.

3. The method of claim 1, wherein determining the specification score comprises:
   obtaining a rule set extracted from the predetermined specification, the rule set comprising a plurality of predetermined rules for the definition of the API;
   determining, by comparing the definition description with the rule set, whether the definition description for the API meets a corresponding rule in the plurality of predetermined rules; and
   determining the specification score based on a degree of the definition description meeting the corresponding rule.

4. The method of claim 1, wherein determining the test score comprises:
   determining at least one of the following: a reference status for the code set of the API in the predetermined test case set, and a test result after at least one test case in the predetermined test case set is applied to the code set of the API, wherein the predetermined test case set is generated based on the definition description of the API; and
   determining the test score based on at least one determined from the reference status and the test result.

5. The method of claim 3, wherein determining the reference status comprises at least one of the following:
   a number of test cases in the predetermined test case set that reference the code set of the API,
   indications of test cases in the predetermined test case set that reference the code set of the API, and
   the number of test cases comprised in the predetermined test case set and describing the API.

6. The method of claim 1, wherein determining the maturity metric of the API comprises:
   comparing the specification score with a first predetermined threshold and comparing the test score with a second predetermined threshold; and
   determining the maturity metric of the API at least based on results of the comparing of the specification score with the first predetermined threshold and comparing of the test score with the second predetermined threshold.

7. An electronic device, comprising:
at least one processor; and
at least one memory storing computer program instructions, which when executed by the at least one processor, cause the device to perform actions, the actions comprising:
determining a specification score of an application program interface (API) by comparing a definition description for the API with a predetermined specification corresponding to the API, the specification score indicating a degree of matching between the definition description and the predetermined specification;
determining a test score for the API by applying a predetermined test case set to a code set of the API, the test score indicating a test status for the code set;
determining a maturity metric of the API based on the specification score and the test score,
wherein the maturity metric indicates that the API meets the predetermined specification and has the code set implementing functions of the API, and
wherein the maturity metric of the API is determined as a direct sum or a weighted sum of the specification score and the test score;
identifying an auxiliary usage description related to the API; and
determining an auxiliary score of the API based on the auxiliary usage description, wherein determining the maturity metric of the API further comprises:
determining the maturity metric further based on the auxiliary score.

8. The device of claim 7, wherein identifying the auxiliary usage description comprises at least one of the following:
identifying the auxiliary usage description related to the API from the definition description of the API; and
identifying the auxiliary usage description related to the API from an external document of the API.

9. The device of claim 7, wherein determining the specification score comprises:
obtaining a rule set extracted from the predetermined specification, the rule set comprising a plurality of predetermined rules for the definition of the API;
determining, by comparing the definition description with the rule set, whether the definition description for the API meets a corresponding rule in the plurality of predetermined rules; and
determining the specification score based on a degree of the definition description meeting the corresponding rule.

10. The device of claim 7, wherein determining the test score comprises:
determining at least one of the following: a reference status for the code set of the API in the predetermined test case set, and a test result after at least one test case in the predetermined test case set is applied to the code set of the API, wherein the predetermined test case set is generated based on the definition description of the API; and
determining the test score based on at least one determined from the reference status and the test result.

11. The device of claim 10, wherein determining the reference status comprises at least one of the following:
a number of test cases in the predetermined test case set that reference the code set of the API,
indications of test cases in the predetermined test case set that reference the code set of the API, and
the number of test cases comprised in the predetermined test case set and describing the API.

12. The device of claim 7, wherein determining the maturity metric of the API comprises:
comparing the specification score with a first predetermined threshold and comparing the test score with a second predetermined threshold; and
determining the maturity metric of the API at least based on results of the comparing of the specification score with the first predetermined threshold and comparing of the test score with the second predetermined threshold.

13. A computer program product tangibly stored in a non-volatile computer-readable medium and comprising machine-executable instructions, which when executed by a processor, cause the processor to perform actions, the actions comprising:
determining a specification score of an application program interface (API) by comparing a definition description for the API with a predetermined specification corresponding to the API, the specification score indicating a degree of matching between the definition description and the predetermined specification;
determining a test score for the API by applying a predetermined test case set to a code set of the API, the test score indicating a test status for the code set;
determining a maturity metric of the API based on the specification score and the test score,
wherein the maturity metric indicates that the API meets the predetermined specification and has the code set implementing functions of the API, and
wherein the maturity metric of the API is determined as a direct sum or a weighted sum of the specification score and the test score;
identifying an auxiliary usage description related to the API; and
determining an auxiliary score of the API based on the auxiliary usage description, wherein determining the maturity metric of the API further comprises:
determining the maturity metric further based on the auxiliary score.

14. The computer program product of claim 13, wherein identifying the auxiliary usage description comprises at least one of the following:
identifying the auxiliary usage description related to the API from the definition description of the API; and
identifying the auxiliary usage description related to the API from an external document of the API.

15. The computer program product of claim 13, wherein determining the specification score comprises:
obtaining a rule set extracted from the predetermined specification, the rule set comprising a plurality of predetermined rules for the definition of the API;
determining, by comparing the definition description with the rule set, whether the definition description for the API meets a corresponding rule in the plurality of predetermined rules; and
determining the specification score based on a degree of the definition description meeting the corresponding rule.

16. The computer program product of claim 13, wherein determining the test score comprises:
determining at least one of the following: a reference status for the code set of the API in the predetermined test case set, and a test result after at least one test case in the predetermined test case set is applied to the code set of the API, wherein the predetermined test case set is generated based on the definition description of the API; and determining the test score based on at least one determined from the reference status and the test result.

17. The computer program product of claim 16, wherein determining the reference status comprises at least one of the following:
   a number of test cases in the predetermined test case set that reference the code set of the API,
   indications of test cases in the predetermined test case set that reference the code set of the API, and
   the number of test cases comprised in the predetermined test case set and describing the API.

18. The computer program product of claim 13, wherein determining the maturity metric of the API comprises:
   comparing the specification score with a first predetermined threshold and comparing the test score with a second predetermined threshold; and
   determining the maturity metric of the API at least based on results of the comparing of the specification score with the first predetermined threshold and comparing of the test score with the second predetermined threshold.

* * * * *